United States Patent Office 2,752,330
Patented June 26, 1956

2,752,330

EMULSION POLYMERIZATIONS OF BUTADIENE-1,3 COMPOUNDS

Stanford J. Hetzel, Cheltenham, Pa., assignor to Sun Oil Company, Philadelphia, Pa., a corporation of New Jersey No Drawing. Application January 3, 1952,
Serial No. 264,849

10 Claims. (Cl. 260—82.1)

This invention relates to emulsion polymerization of butadiene-1,3 compounds and more particularly to emulsifying agents for use in such emulsion polymerization.

It is well known that butadiene-1,3 compounds and mixtures thereof with other monomers can be polymerized in aqueous emulsion to produce synthetic rubber latices which can be coagulated to yield synthetic rubber. Synthetic rubber-like materials have been prepared by polymerizing, in aqueous emulsion, butadiene-1,3 halogen derivatives thereof, or other substituted butadiene-1,3 compounds, or by interpolymerizing the above with other compounds containing a vinyl group such as styrene, acrylic acid esters, acrylic acid nitrile, vinyl chloride, etc.

In emulsion polymerization of butadiene-1,3 compounds, it is customary to employ an emulsifying agent having the property of forming an emulsion of hydrocarbon materials with the aqueous phase of the polymerization mixture. It is believed that the emulsifying agent performs an important function in polymerization reaction in that it forms micelles in the polymerization mixture in the interior of which micelles the polymerization reaction takes place. The nature of the emulsifying agent is an important determining factor in the speed at which the polymerization takes place. The choice of emulsifying agent is therefore an important matter in emulsion polymerization.

According to the present invention particularly rapid low temperature polymerizations of butadiene-1,3 compounds are obtained. Low temperature polymerization of butadiene compounds is well known in the art as referring to polymerization at temperatures substantially below 122° F., e. g. 41° F. and 14° F. The rapid polymerizations according to the present invention are obtained by the use of an emulsifying agent which is a mixture of alkali metal soaps of petroleum naphthenic acids with alkali metal soap of a fatty acid, with alkali metal soap of a rosin acid, or with mixtures of such fatty acid soap and rosin acid soap. It has been found that the use of such a mixed emulsifying agent is advantageous in that it provides a more rapid polymerization with a given total amount of emulsifying agent than would be expected from the polymerization rates obtained with each constituent by itself; generally, a more rapid polymerization is obtained than it is possible to obtain when the same amount is used of an emulsifying agent consisting either of alkali metal soaps of petroleum naphthenic acids by themselves or alkali metal soaps of fatty acids themselves, or alkali metal soaps of rosin acids by themselves.

The fatty acid soap which is employed according to one embodiment of the present invention is one which is soluble in water at the temperature which is employed in the emulsion polymerization and which is in other respects also a suitable emulsifying agent for use at the temperature employed. Examples of suitable fatty acid soaps are oleate and laurate soaps, and soaps of mixed fatty acids such as tallow acids. Other fatty acid soaps can be employed provided that they are sufficiently soluble to be suitable for use at the temperature employed. Fatty acid soaps which are suitable for emulsion polymerization at most or all temperatures commonly employed are well known in the art and a person skilled in the art will know which fatty acids can be suitably employed. In some cases it will be necessary to take precautions against coagulation of the polymerization mixture when certain fatty acids are used and it is within the ability of a person skilled in the art to provide a suitable anti-coagulant in sufficient amount to accomplish this end.

The rosin acid soap which is employed can be any suitable known soap of an acid obtained from rosin, preferably disproportionated, hydrogenated, or dehydrogenated rosin.

The naphthenic acids whose soaps are employed according to the present invention are similar to the naphthenic acids whose use in emulsion polymerization at temperatures below and above 32° F. is respectively disclosed and claimed in copending applications Serial Nos. 194,193 and 194,194, both filed November 4, 1950, by James S. Sweely, now Patent No. 2,664,415, issued December 29, 1953, and Patent No. 2,667,471, issued January 26, 1954, respectively. When the polymerization temperature is above 32° F., alkali metal soaps, e. g. sodium, potassium, etc., soaps can be employed, but at temperatures below 32° F., potassium soaps must be employed. The petroleum naphthenic acids which are used are mixtures of cycloaliphatic monocarboxylic acids which can be obtained in relatively concentrated form from crude petroleum by steps including saponifying a fraction of the petroleum to obtain a mixture comprising a major proportion of unsaponifiable material, e. g. oil, and a minor proportion of naphthenate soaps, effecting an at least partial separation between soaps and unsaponifiable material, and then acidifying the separated soaps to obtain naphthenic acids in relatively concentrated form.

Naphthenic acids for use according to the present invention are preferably those which have unsaponifiable material content less than about ten weight per cent because faster rates of polymerization are obtained with soaps of such acids. Any suitable known method, e. g. the extraction method described subsequently, can be used to obtain naphthenic acids containing less than ten weight per cent unsaponifiable material.

Still faster rates of polymerization can be obtained with soaps of acids having certain preferred properties in addition to the preferred unsaponifiable material content specified above. These preferred properties are as follows:

The naphthenic acids used are preferably free from components boiling above about 510° F. at 1 mm. Hg pressure. Removal of constituents boiling above the desired maximum boiling point from naphthenic acids containing such constituents can be effected by any suitable means, e. g. vacuum distillation, for separation of acids according to molecular weight. When the polymerization temperature is above 32° F., the acids are preferably free from components boiling above about 485° F. at 1 mm. Hg.

Furthermore, the naphthenic acids preferably have bromine number, as determined according to the method specified in ASTM Test 875–46T, less than about 6. Reduction of bromine number to the desired degree, if necessary, can be effected, for example, by contacting the acids with formaldehyde, or with a material capable of liberating formaldehyde, at an elevated temperature, e. g. 200–300° F. In such treatment, if solid materials are formed, they can be removed by suitable means, e. g. filtration. A catalyst such as mineral acid is used in the contacting step. It has been found that treatment as described above substantially reduces the bromine number of naphthenic acids originally having bromine number of, for example, at least 6. Any other suitable method can be used to reduce the bromine number.

Naphthenic acids used according to the present invention also preferably have saponification value, expressed as saponification value of oil-free naphthenic acids, within the approximate range 160–300, indicating average molecular weights for the acids of about 190–350. Generally, the desired saponification value can be obtained by distillation, if necessary, to obtain fractions having the desired average molecular weight.

According to the present invention, polymerization mixtures are prepared comprising water, a butadiene-1,3 compound, and possibly other monomers for interpolymerization therewith, and as emulsifier mixtures of soaps of petroleum naphthenic acids and of soaps of fatty or rosin acids. Other ingredients are generally used, in accordance with prior art practice, to assist the polymerization, e. g. catalyst, catalyst activator, etc. Furthermore, in polymerizations below 32° F. a suitable antifreeze compound, e. g. glycerol, glycol, methanol or dioxane, etc., is also used in the polymerization recipe. Methanol is superior to other aliphatic monohydric alcohols for use in the process of the invention.

The mixed emulsifying agent employed according to the present invention can be prepared by admixing petroleum naphthenic acids and fatty acids or rosin acids or both and contacting the mixture with a suitable reagent such as an alkali metal hydroxide for converting the acids to the corresponding soaps. Alternatively the soaps of petroleum naphthenic acids can be prepared separately from the soaps of fatty acids or rosin acids and the resulting portions of soap dissolved in the aqueous phase of the polymerization recipe.

The temperature at which the polymerization according to the present invention is conducted is preferably within the range 5° F. to 100° F., more preferably within the range 10° F. to 50° F. Temperatures which are commonly employed for such low temperature polymerizations are 14° F. and 41° F.

The relative amounts of naphthenates and of soaps selected from the group consisting of fatty acid soaps and rosin soaps and mixtures of fatty acid soaps and rosin soaps, in the mixed emulsifier employed according to the present invention, can vary; preferably, no constituent comprises less than 5% of the mixed emulsfier; more preferably no constituent comprises less than 20% of the mixed emulsifier.

The following examples illustrate the invention:

*Example 1*

In this example interpolymerizations of butadiene-1,3 and styrene were conducted at 41° F. with different emulsifying agents in each polymerization. In one of the interpolymerizations sodium oleate was employed as the emulsifying agent; in another of the interpolymerizations sodium soaps of petroleum naphthenic acids were employed as the emulsifying agent; and in a third interpolymerization a mixture of sodium oleate and sodium soaps of petroleum naphthenic acids was used as the emulsifying agent, the total weight of emulsifying agent in each interpolymerization being the same.

In each interpolymerization the polymerization recipe consisted of 72 parts by weight butadiene, 28 parts by weight styrene, 0.16 part of a modifier comprising alkyl mercaptans analyzing 15.6 per cent sulfur, this modifier being known commercially as Sulfole B–8, 0.5 part of potassium chloride as anticoagulant, 0.1 part cumene hydroperoxide as catalyst, 1.72 parts of a catalyst activator complex (0.14 part of ferrous sulfate heptahydrate, 0.3 part of potassium pyrophosphate, and 1.28 parts of cerelose), 180 parts distilled water, and 4.7 parts (dry basis) of emulsifying agent, and 0.1 part of an auxiliary emulsifying agent known commercially as Daxad 11 and comprising a condensation product of formaldehyde and naphthalene sulfonic acids.

The petroleum naphthenic acids whose potassium soaps were employed as emulsifying agents in the present example were gas oil naphthenic acids obtained by steps including distilling petroleum to obtain a gas oil distillate, contacting the gas oil distillate with caustic soda to obtain an aqueous layer containing extracted sodium naphthenates, contacting the aqueous layer with petroleum naphtha to extract unsaponifiable material therefrom, acidifying the resulting aqueous layer and separating the gas oil naphthenic acids thus obtained from the aqueous layer. The gas oil naphthenic acids had saponification value on an oil-free basis of about 213, bromine number of about 2.2, and boiling range of 276° F. to 382° F. at 1 mm. Hg, and were substantially free from unsaponifiable material. They were contacted with sodium hydroxide to obtain sodium soaps which were employed as emulsifying agents in the interpolymerizations conducted according to the present example.

Each polymerization was conducted at a closely controlled temperature of 41° F., employing the polymerization recipe previously described. Samples were removed from the polymerization mixture at intervals and the per cent polymerization obtained at each interval was determined by measuring the weight of solid polymer in each sample. From this determination a graph of per cent polymerization against polymerization time was constructed and from this graph the time required in each interpolymerization to obtain 60% polymerization was determined.

The following table shows the results obtained in three interpolymerizations, the first employing sodium oleate as emulsifying agent and the second employing sodium naphthenates as described above as emulsifying agent, and the third employing 50% sodium oleate and 50% sodium naphthenates as emulsifying agent, the total amount of emulsifying agent in each case being 4.7 parts by weight in the above-described polymerization recipe.

| Run No. | Emulsifying Agent | Time in Minutes |
| --- | --- | --- |
| 1 | Sodium Oleate | 620 |
| 2 | Sodium Naphthenate | 560 |
| 3 | 50% Sodium Oleate and 50% Sodium Naphthenate. | 525 |

This example shows that employing a mixture of sodium naphthenate and sodium oleate as emulsifying agent in interpoymerization of butadiene-1,3 and styrene at 41° F. produces results which are unexpectedly superior to the results obtained by using either sodium naphthenate or sodium oleate alone as emulsifying agent. Whereas it would be expected that the use of the mixed emulsifying agent would result in a time required to obtain 60% polymerization somewhere between the required times for the respective emulsifying agents when used alone, the above example shows that the mixed emulsifying agent provides an interpolymerization wherein the time required to obtain 60% polymerization is less than the times required respectively with the two emulsifying agents used separately by themselves.

*Example II*

In this example three polymerizations of butadiene-1,3 and styrene were conducted at 41° F. The polymerization recipe was the same as that employed in Example I. The sodium naphthenates which were employed as emulsifying agents were the same naphthenates employed in Example I. Sodium soaps of disproportionated rosin acids, known commercially as Dresinate 731, were employed in this example in place of the sodium oleate employed in Example I.

The following table presents the results of the interpolymerizations conducted in this example:

| Run No. | Emulsifying Agent | Time in Minutes |
| --- | --- | --- |
| 1 | Dresinate 731 | 675 |
| 2 | Sodium Naphthenate | 560 |
| 3 | 50% Dresinate 731 and 50% Sodium Naphthenate. | 530 |

This example shows that sodium rosin soaps as well as sodium oleate provide unexpectedly advantageous results when employed in mixtures with sodium naphthenate as emulsifying agents in interpolymerization of butadiene-1,3 and styrene at 41° F.

*Example III*

The unexpectedly advantageous results obtained as described above at 41° F. with mixed emulsifying agents were in other experiments also obtained in polymerization with mixed emulsifying agents at 14° F. employing a polymerization recipe including methanol as antifreeze. In these experiments, polymerization conducted in the presence of 5 parts of emulsifier per 180 parts of water, the emulsifier consisting of potassium naphthenate and potassium oleate in equal amounts, gave 60% conversion in about 130 minutes less time than polymerization conducted in the presence of 5 parts of emulsifier consisting of either of the naphthenate or oleate emulsifier alone. Also, polymerization in the presence of 5 parts of emulsifier consisting of potassium naphthenate and potassium laurate in equal amounts, gave 60% conversion in about 20 minutes' less time than polymerization in the presence of 5 parts of emulsifier consisting of either the naphthenate or laurate emulsifier alone.

At 122° F., however, experimental work with mixtures of sodium naphthenates with sodium rosin soaps (Dresinate 731) in equal proportions showed that the mixed emulsifiers in both cases gave 72% conversion in times intermediate between the times required in polymerizations with sodium naphthenate alone and with Dresinate 731 alone. Similar results were obtained at 122° F. with mixtures of sodium naphthenates with sodium tallow soaps (S. F. Flakes). Thus, whereas at 14° F. and 41° F. a maximum polymerization rate was obtained with mixed emulsifiers, the maximum polymerization rate at 122° F. was obtained with an emulsifier consisting of one of the components of the mixed emulsifier combinations.

Although, in the above examples, butadiene and styrent copolymers are used as examples of polymers of butadiene-1,3 compounds prepared by emulsion polymerization, in the presence of mixed emulsifiers including alkali napthenates, the present invention can also be used in processes wherein copolymers of butadiene and acrylic acid nitrile, or of butadiene and methyl methacrylate, or of isoprene and styrene, or polymers of butadiene, chloroprene or isoprene are prepared by emulsion polymerization, or when other polymerizations of butadiene-1,3 compounds are conducted. Emulsifying agents according to the invention may be used in conjunction with any suitable known polymerization catalyst, initiator, or other polymerization aid.

The concentration of emulsifying agent in the polymerization recipe varies according to the polymerization speed desired. Since mixed emulsifiers used according to the invention generally result in faster polymerizations than previously used emulsifying agents, relatively small concentrations of the mixed emulsifier generally give as good results as relatively large concentrations of other emulsifying agents. However, relatively large concentrations of emulsifier can be used when particularly rapid polymerizations are desired. It is generally preferred that the amount of mixed emulsifier used be within the approximate range 1–8 parts per 180 parts of water.

In some instances, fatty acid soaps show a tendency, when used alone as emulsifying agents in emulsion polymerization of butadiene compounds, to cause pre-flocculation of the polymer, i. e. formation of solid polymer in the polymerization mixture before the desired degree of conversion (e. g. 60 percent) has been obtained. Potassium tallow soaps sometimes show such a tendency. According to the present invention, when fatty acid soaps showing such a tendency are used in admixture with naphthenic acid soaps in sufficient amount, e. g. more than one part of naphthenate per three parts of fatty acid soap, this tendency for pre-flocculation to occur is reduced or eliminated. Since pre-flocculation is disadvantageous in that, among other reasons, it renders accurate control sampling of the polymerization mixture difficult or impossible, the reduction of pre-flocculation tendency is an important advantage of the present invention.

"Percent polymerization," as referred to in the previous examples, was measured by sampling the polymerization mixture, evaporating the sample to dryness, weighing the dried polymer, multiplying the weight of dried polymer by the weight ratio of the original polymerization mixture to the sample, and subtracting the weight of solids in the original polymerization mixture from the multiplication product to obtain the total weight of polymer formed. This total weight is numerically equal to the percent polymerization, based on the original weight of butadiene and styrene since the latter weight was 100 parts.

The invention claimed is:

1. Method for polymerizing a butadiene-1,3 compound which comprises: subjecting such butadiene-1,3 compound in aqueous emulsion to low temperature polymerizing conditions in the presence of water-soluble emulsifying agent comprising alkali metal soaps of petroleum naphthenic acids and a material selected from the group consisting of alkali metal soap of fatty acid, alkali metal soap of rosin acid, and mixtures of such soap of rosin acid and such soap of fatty acid, said alkali metal soaps being potassium soaps when the polymerization temperature is below about 32° F.

2. Method according to claim 1 wherein said butadiene-1,3 compound is interpolymerized with another vinyl compound in the presence of said emulsifying agent.

3. Method according to claim 1 wherein said naphthenic acids contain less than 10 weight percent unsaponifiable material, having bromine number not substantially greater than 6 and saponification value on an unsaponifiables-free basis within the approximate range 160–300, and wherein said naphthenic acids are substantially free from constituents boiling above 510° F. at 1 mm. Hg and, when said temperature is above about 32° F., are substantially free from constituents boiling above 485° F. at 1 mm. Hg.

4. Method according to claim 1 wherein said material is alkali metal oleate.

5. Method according to claim 1 wherein said material is alkali metal laurate.

6. Method according to claim 1 wherein said material is alkali metal soap of tallow acid.

7. Method according to claim 1 wherein said material is alkali metal soap of rosin acid.

8. Method according to claim 1 wherein the polymerization temperature is about 14° F.

9. Method according to claim 1 wherein the polymerization temperature is about 41° F.

10. Method for polymerizing a butadiene-1,3 compound which comprises: subjecting such butadiene-1,3 compound in aqueous emulsion to low temperature polymerizing conditions in the presence of alpha, alpha-dimethyl benzyl hydroperoxide as catalyst and in the presence of a water-soluble emulsifying agent comprising alkali metal soaps of petroleum naphthenic acids and a material selected from the group consisting of alkali metal soap of fatty acid, alkali metal soap of rosin acid, and mixtures of such soap of rosin acid and such soap of fatty acid, said alkali metal soaps being potassium soaps when the polymerization temperature is below about 32° F.

References Cited in the file of this patent

UNITED STATES PATENTS

| | | |
|---|---|---|
| 2,588,975 | Fryling et al. | Mar. 11, 1952 |
| 2,664,415 | Sweely | Dec. 29, 1953 |

OTHER REFERENCES

Starkweather et al.: Ind. and Eng. Chem., vol. 39, No. 2, pp. 210–221, February 1947.